United States Patent [19]

McCormick

[11] Patent Number: 6,102,089
[45] Date of Patent: Aug. 15, 2000

[54] ASSEMBLY FOR CONVERTING A DRILL PRESS INTO A WOOD LATHE

[76] Inventor: Matthew Colin McCormick, Rte. 2, Box 292A, Alvin, Tex. 77511

[21] Appl. No.: 09/260,444

[22] Filed: Mar. 2, 1999

[51] Int. Cl.[7] .................................................... B27C 9/00
[52] U.S. Cl. ......................... 144/1.1; 29/26 R; 29/27 A; 144/46; 144/365; 408/20
[58] Field of Search ................................. 29/26 R, 26 A, 29/27 A, 560; 144/1.1, 35.2, 46, 48.3, 48.7, 365; 408/20, 124, 127, 236

[56] References Cited

U.S. PATENT DOCUMENTS

| | | | |
|---|---|---|---|
| 2,089,362 | 8/1937 | Haas | 144/46 UL |
| 2,200,799 | 5/1940 | Miller | 144/46 UX |
| 3,709,622 | 1/1973 | Morse. | |
| 3,828,834 | 8/1974 | Morse. | |
| 4,830,069 | 5/1989 | Milyard | 144/35.2 |
| 5,562,135 | 10/1996 | Beth et al. . | |
| 5,890,521 | 4/1999 | Dunn | 29/26 R |

*Primary Examiner*—W. Donald Bray
*Attorney, Agent, or Firm*—A. M. Arismendi, Jr.

[57] ABSTRACT

The present invention relates to a new and improved modification for converting a drill press into a wood lathe. Further, the present invention relates to an adaption kit for the modification of a conventional drill press into a general-purpose wood lathe. A drill press is modified for use as a wood lathe useful for shaping wood stock with a shaping tool. A driving spur is affixed to the chuck of the drill press for engaging one end of the wood stock. An adapter plate is affixed to the platform of the drill press. A tailstock is removably attached to the adapter plate for engagement of the opposite end of the wood stock. A tool rest is affixed to the adapter plate for use with a shaping tool.

16 Claims, 2 Drawing Sheets

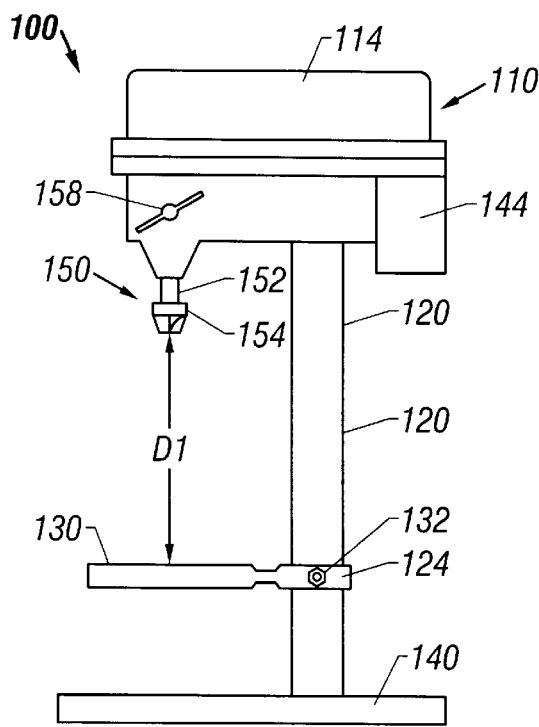
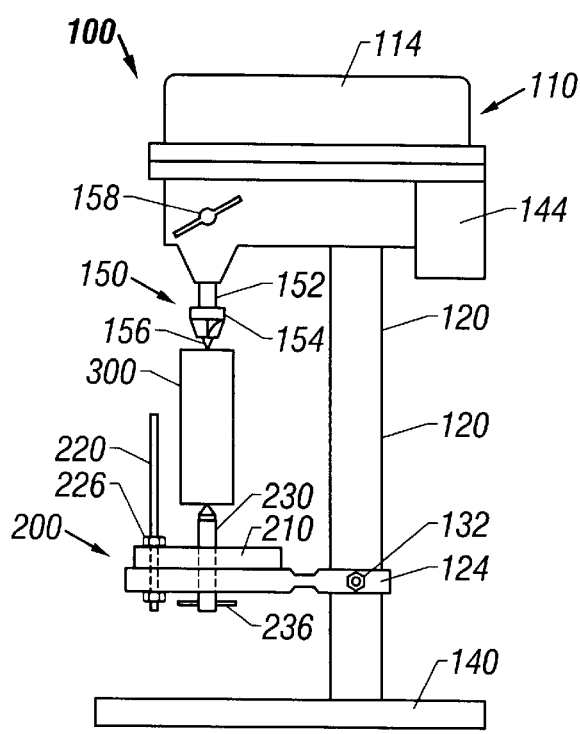
FIG. 1
*(Prior Art)*
FIG. 2
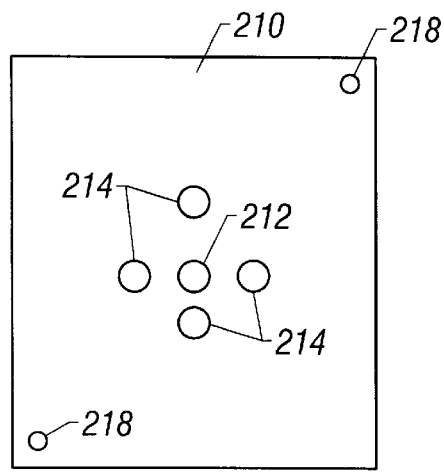
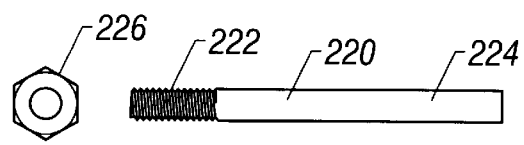
FIG. 3
FIG. 4

ASSEMBLY FOR CONVERTING A DRILL PRESS INTO A WOOD LATHE

FIELD OF THE INVENTION

The present invention relates to a new and improved modification for converting a drill press into a wood lathe. Further, the present invention relates to the adaption kit for the modification of a conventional drill press into a general-purpose wood lathe.

BACKGROUND OF THE INVENTION

General-purpose wood lathes are rather simple machines in which the primary components include a frame, a spindle mounted on the frame for relatively high-velocity rotation, a tool rest adjustably mounted on the frame in operating relationship with the axis of rotation of the spindle, and a tailstock for supporting the end of the work piece opposite from the end engaged by the spindle. In turning long slender pieces (such as table legs), the work piece is held between a center mounted in the tailstock and the driving center mounted in the spindle. The cutting action is performed by manually-held shaping tools supported by the tool rest, which is in close proximity to the wood piece being rotated. The general design and form of this type of machine is very old, but its utility has not diminished over time.

Because of its universal use and inevitable presence in many home workshops, several attempts have been made to adapt an existing drill press into a general purpose wood lathe when occasional carving is desired. Thus, it has been recognized that the drill press represents not only a machine in its own right, but also a possible source of power and control for operational use outside its intended design. The power head of the drill press can itself be used as a head stock, or confined to use as a source of power. This potential adaptability, combined with the fact it is typically impractical from an economic perspective to purchase a general purpose wood lathe for the purpose of occasional wood carving, has given rise to significant demand for the adaptation of the drill press for occasional use as a wood lathe.

Attempts to adapt the drill press for use as a wood lathe have generally included devices which are costly and overly complex. For example, U.S. Pat. No. 3,709,622 (1973) to Morse (the '622 reference) discloses a rather complex assembly for adaptation of a drill press into a wood lathe which has the tailstock connected by a bar to the lathe headstock. This device requires significant assembly time and is more desirable in an industrial setting. There is, therefore, a need for an adaption assembly that is simple, has minimal assembly time, and remains low in cost.

U.S. Pat. No. 3,828,834 (1974) also to Morse (the '834 reference) teaches the mounting of a device onto a drill press when the drill press is in a horizontal position. However, not all drill presses available are designed to be rotated into a horizontal position. Thus, there is a need for an adaption assembly capable of use on a drill press when in either a horizontal or a vertical position. In addition, the drill press disclosed in the '834 reference is mounted on a work table. Since many owners of small drill presses operate the machines out of their own homes, there is not always space or even the need for a separate work table to mount the drill press on. Therefore, there is a need for an adaption assembly that does not require a separate work table to mount the drill press on.

In addition to attempts to adapt existing machines such as drill presses into machines of alternative uses, there have also been attempts in the prior art to manufacture machines capable of performing multiple functions. For example, U.S. Pat. No. 5,562,135 (1996) to Beth et al (the '135 reference) discloses a machine manufactured to perform various functions such as drilling and routing. However, machines such as the device disclosed in the '135 reference are generally complex and thus cost prohibitive for the occasional operator. Again, there is a need for an adaption assembly that enables a drill press to perform functions of a wood lathe that is simple and low in cost.

SUMMARY OF THE INVENTION

The present invention relates to a new and improved modification for converting a drill press into a wood lathe. Further, the present invention relates to an adaption kit for the modification of a conventional drill press into a general-purpose wood lathe.

In a preferred embodiment of the present invention, a drill press is modified for use as a wood lathe useful for shaping wood stock with a shaping tool. The wood stock is typically an elongated piece of wood. The modified drill press has a column with a base end mounted to a support and a free end for receiving the drill power head. The main components of the power head are the power source, or motor, and the spindle affixed to the powerhead. The spindle is forced into a relatively high velocity rotation by the power source. A chuck is affixed to the spindle to removably receive a driving spur. The driving spur engages one end of the wood stock. A platform is attached to the column, with the column adjustable along the longitudinal axis of the column to vary the distance between the platform and the chuck. An adapter plate is affixed to the platform. One end of the tool rest is attached to the adapter plate and the opposite end is used to rest and manipulate the shaping tool. A tailstock is removably attached to the adapter plate. The engagement end of the tailstock is for engaging the opposite end of the wood stock.

Another preferred embodiment of the present invention provides an adapter kit for converting a drill press into a wood lathe for shaping wood stock. The drill press having a column with a power source mounted on the column for rotatably driving a spindle. Affixed to the spindle is a chuck for removably receiving working tools. Attached to the column is a platform adjustable along the longitudinal axis of the column to vary the distance between the platform and the chuck. The adapter kit is first comprised of a driving spur removably received by the chuck. The driving spur engages an end of the wood stock. The adapter kit further comprises an adapter plate affixed to the platform. A tool rest is affixed to the adapter plate for resting and manipulating the shaping tool. Also affixed to the adapter plate is a tailstock for engaging the opposite end of the wood stock.

In another preferred embodiment of the present invention, a method of using an adapter kit for modifying a drill press for use as a wood lathe is provided. The drill press is comprised of a column, a power source mounted to the column, a spindle rotatably driven by the power source along an axis parallel to the column, a chuck affixed to the spindle, and a platform attached to the column. The platform is adjustable along the longitudinal axis of the column to vary the distance between the platform and the chuck. The adapter kit is first comprised of a driving spur removably received by the chuck for engaging the wood stock. The adapter kit further comprises an adapter plate, a tailstock, and a tool rest. The method comprises the steps of securing the adapter plate to the platform, affixing the tailstock to the adapter plate, affixing the driving spur to the chuck, and attaching the tool rest to the adapter plate.

It is therefore a feature of the present invention to provide a modification of a drill press for use as a wood lathe that is simple, requires minimal assembly time and is low in cost. Further, it is a feature of the present invention that the modification is available for drill presses in both vertical and horizontal positions. Still further, it is a feature of the present invention that the modified drill press does not require a separate work table.

Other objects, and the advantages, of the present invention will be made clear to those skilled in the art by the following detailed description of the preferred embodiments constructed in accordance with the teachings of the present invention.

DESCRIPTION OF THE DRAWINGS

FIG. 1 is a side plan view of a drill press which could be used in conjunction with the present invention.

FIG. 2 is a side plan view of a drill press modified with the present invention to function as a wood lathe.

FIG. 3 is a top plan view of the adapter plate of a preferred embodiment of the present invention with locations for mounting of the tool rest placed at various distances from the center tailstock.

FIG. 4 is a side plan view of a preferred embodiment of the tool rest.

DESCRIPTION OF THE PREFERRED EMBODIMENTS

Figure 5:
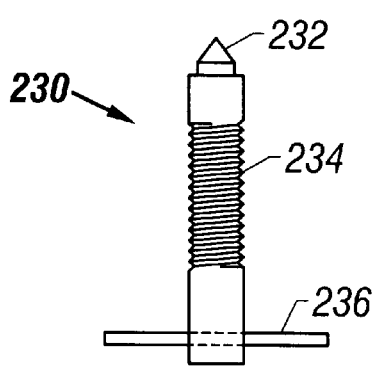
FIG. 5 is a side plan view of a preferred embodiment of the tailstock.

The following detailed description illustrates the invention by way of example and not by way of limitation. The drill press 100 shown in FIGS. 1 and 2 includes a power head 110 mounted on a column 120. The power head 110 is comprised of a casing 114 which houses a motor 144 and the drill components, indicated generally as numeral 150. The drill components 150 include the spindle 152, the chuck 154, and the adjustment handle 158. The motor 144 forces the spindle 152 into relatively high velocity rotation about an axis parallel with the column 120. The chuck 154 is affixed to the spindle 152 to removably receive working tools such that rotation of the spindle 152 forces rotation of the attached working tools. In typical drill press operation, the working tools attached to the spindle 152 by the chuck 154 are variously sized and shaped drill bits. Rotation of the spindle 152 causes rotation of the drill bits. The adjustment handle 158 is used to raise or lower the spindle 152 in a direction parallel with the longitudinal axis of the column 120. In the present invention, the adjustment handle 158 helps to accommodate different lengths of wood stock 300. Further, in a preferred embodiment of the present invention, the power head 110 is adjustable along the longitudinal axis of the column 120.

Also affixed to the drill press 100 is an adjustable platform 130. The adjustable platform 130 is affixed to the column 120 by securing device 134. One skilled in the art will recognize that the securing device 134 can be any number of mechanisms such as clamps, securing bolts, slotted connections, or welded connections that enable the platform 130 to be affixed to the column 120. In a preferred embodiment of the present invention, the securing device 134 resembles a clamp that is adjustably mounted on the column 120. By the use of adjustment knob 132, the clamp 134, and consequently the platform 130, can be adjusted along the longitudinal axis of the column 120. Raising or lowering the platform 130 enables adjustment of the distance between the platform 210 and the chuck 154, indicated as D1 on FIG. 1. The adjustment of the platform 130 and the adjustment of the spindle 152 enable the preferred embodiment of the present invention to accommodate a wide range of sizes of wood stock 300. It should be noted, however, that one skilled in the art will recognize that it is not necessary that both the spindle 152 and the platform 130 be adjustable. Having only one or the other adjustable does not limit the functionality of the present invention, but rather limits the range of wood stock 300 that can be accommodated.

Opposite the power head 110, the column 120 is secured to a base 140. The base 140 provides stability to the drill press 100 and the modification parts. In a preferred embodiment of the present invention the base 140 is a workbench to which the column 120 is affixed. However, one skilled in the art will recognize that the ground, or a plate mounted to the ground or workbench are also suitable for use as the base 140 of the drill press 100.

Figure 7:
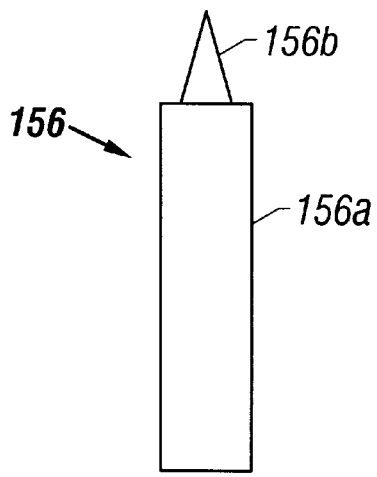
FIG. 7 is a side plan view of a preferred embodiment of the driving spur of the present invention.

FIG. 2 shows the drill press 100 modified into a wood lathe by the adapter kit 200. In the present invention, the working tool that makes up the part of the adapter kit 200 that is removably received by the chuck 154 is a driving spur 156. Referring to FIG. 7, the neck 156a of the driving spur 156 is received by the chuck 154. The neck 156a is sized and shaped to enable engagement by a conventional chuck 154. In the preferred embodiment of the present invention, the opposite end 156b of the driving spur 156 is a conical point 156b. The conical point 156b of the driving spur 156 engages one end of the wood stock 300 such that as the spindle 152 rotates, the driving spur 156 forces the wood stock 300 into rotation. One skilled in the art will recognize that the top point 156b of the driving spur 156 does not have to be of conical shape. All that is necessary is that the top point 156 be able to engage the wood stock 300.

Referring back to FIG. 2, the adapter kit 200 is further comprised of an adapter plate 210, a tool rest 220, and a tailstock 230. The adapter plate 210 is shown in a top plan view in FIG. 3. The adapter plate 210 is secured to the platform 130 by platform securing devices 218. In a preferred embodiment, the securing devices 218 are located at opposite corners of the adapter plate 210. However, one skilled in the art will recognize that there are a multiplicity of ways in which to secure the adapter plate 210 to the platform 130. For example, it is not necessary that there be two securing devices 218, there can be only one or a multiplicity of securing devices. Further, if desired to permanently affix the plate 210 to the platform 130, welding the two together removes the need for the securing devices 218. It should also be noted that in an embodiment where there is no platform 130, the plate 210 is affixed to the workbench or other means acting as the base 140.

In the center of the adapter plate 210 is a tailstock insertion location 212 for engaging the tailstock 230. The tailstock 230, as shown in FIG. 5, has a conical point 232 and a securing portion 234. In a preferred embodiment of the present invention, the tailstock insertion location 212 is a threaded hole and the securing portion 234 of the tailstock 230 is also threaded. The threaded portion 234 of the tailstock 230 engages the tailstock insertion location 212. However, one skilled in the art will recognize that there are a number of ways in which to attach the tailstock 230 to the adapter plate 210. For example, rather than are movable threaded connection, the tailstock 210 could be permanently affixed to the plate 210 by welding the two together. Further, it should be noted that the tailstock insertion location 212 does not have to be in the center of the adapter plate 210. One skilled in the art will recognize that it is only necessary that the centerline of the tailstock insertion location 212 be along the same line of axis as the spindle 152.

In another preferred embodiment, the insertion location 212 is a threaded hole which coincides with a threaded hole in the platform 130. Again, if there is no platform, the insertion location 212 coincides with a threaded hole in the means forming the base 140. As shown in FIG. 2, the base of the tailstock 230 in the preferred embodiment, protrudes through the bottom of the platform 130. Further, in the preferred embodiment, the base of the tailstock 230 has a handle 236 (shown in FIG. 5) which is removably affixed to the base of the tailstock 230 below the platform 130. The handle 236 is used to rotate the tailstock 230 within the threaded hole 212 to enable adjustment to the height at which the tailstock 230 protrudes from the top of the plate 210. The handle can be any number of devices such as a cotter pin. The ability to adjust the height at which the tailstock 230 protrudes from the top of the plate 210 enables final adjustment to accommodate different length wood stock 300 without having to adjust the height of the platform 130 or having to lower the spindle 152.

The conical point 232 of the tailstock 230 is for engagement with the wood stock 300. The conical point 232 is located along the line of axis of the spindle 152. The conical point 232 engages the center of the wood stock 300 on the end opposite that which is engaged by the driving spur 156. It should be noted that although the tailstock 230 in a preferred embodiment of the present invention has a conical point 232, the present invention is not limited to conical points. The point on the tailstock can be any shape or size as long as the point engages the wood stock 300 without restricting its rotation.

Figure 6:
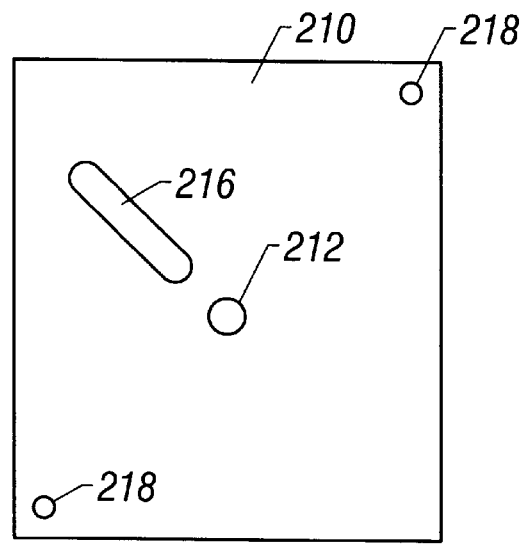
FIG. 6 is a top plan view of an alternate embodiment of the adapter plate of the present invention with a slot for mounting the tool rest at various distances from the center tailstock.

As shown in FIG. 3, the adapter plate 210 has various tool rest insertion locations, indicated generally by the numeral 214. The tool rest insertion locations 214 are used for mounting the tool rest 220. The insertion locations 214 are placed at various distances from the center of the tailstock 230 in order to accommodate various sizes and shapes of wood stock 300. In the embodiment shown in FIG. 3, there are four variable distance insertion locations 214. However, one skilled in the art will recognize that there can be any number of insertion locations 214 and the insertion locations can be located anywhere on the adapter plate 210. An alternate embodiment shown in FIG. 6 shows the insertion locations comprised of a single slot 216 which can accommodate a wide range of positions of the tool rest 220. One skilled in the art will recognize that a multiple slot adapter plate 210 can also be used to accommodate a still wider range of tool rest 220 locations.

Figure 8:
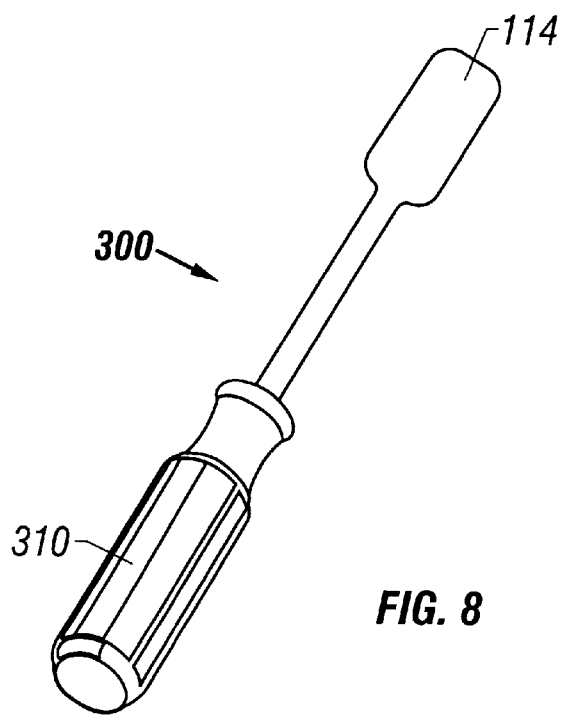
FIG. 8 is a side plan view of a preferred embodiment of a shaping tool of the present invention.

The tool rest 220, shown in FIG. 4, consists of an engagement end 222 and a tool end 224. The tool rest 220 can be inserted into and secured within any of the tool rest insertion locations 214 shown in FIG. 3 or slot 216 in FIG. 6. In the preferred embodiment, the engagement end 222 of the tool rest 220 is threaded and is secured to the adapter plate 210 by the tool rest stop nut 226. However, one skilled in the art will recognize that using a stop nut 226 is only one of many ways in which to secure the tool rest 220 to the adapter plate 210. For example, the tool rest 220 can be secured to the adapter plate 210 by means such as clamps, pins, fasteners, etc. Further, although the embodiment shown in FIG. 2 illustrates the tool rest 220 extending through both the adapter plate 210 and the platform 130, one skilled in the art will recognize that the tool rest 220 affixed only to the adapter plate 210 or only to the platform 130. It is not necessary that the tool rest 220 interact with both the platform 130 and the adapter plate 210. The tool end 224 provides a rest for a shaping tool 300 (shown in FIG. 8). The tool end 224 provides stability to the shaping without inhibiting maneuverability of the shaping tool 300 while in use. Referring to FIG. 8, a preferred embodiment of a shaping tool 300 is shown. The shaping tool 300 is comprised of a handle 310 and a blade 320. One skilled in the art will recognize that the shaping tool 300 can have any number of embodiments depending upon the desired use. The shaping tool 300 shown in FIG. 8 is simply illustrative of one type of shaping tool 300. Further, referring back to FIG. 4, in the preferred embodiment, the tool rest 220 is a steel bar. However, one skilled in the art will recognize that other shapes and configurations will work equally as well. One alternative embodiment would be a bar with a hole in the center through which the tool would be inserted. Alternatively, the top of the bar could have a clasp to hold the tool. Thus, the tool rest 220 of the present invention need only provide stability and maneuverability for the tool.

Referring back to FIGS. 1 and 2, the preferred manner in which the drill press 100 is modified will be described. To begin, the adapter plate 210 is secured to the platform 130 by use of securing devices 218. As described above, in the absence of a platform 130 on the drill press 100, the adapter plate 210 is secured to the work bench or other means acting as a base 140 for column 120. Next, the tailstock 230 is secured to the tailstock insertion point 212 in the adapter plate 210. In the preferred embodiment, the tailstock 230 threadably engages the tailstock insertion point 212. The driving spur 156 is then affixed to the chuck 154 attached to the spindle 152.

Once the adapter assembly is installed, the wood stock 300 is placed in between the driving spur 156 and the tailstock 230. In order to securely engage the wood stock 300, the driving spur 156 is raised or lowered by rotating the adjustment handle 158 and the platform 130 is raised or lowered by rotating the adjustment knob 132. Final adjustments can be made by raising or lowering the conical point 232 of the tailstock 230 by rotating the handle 236. While the wood stock 300 is engaged between the driving spur 156 and the tailstock 230, the tool rest 220 is affixed to the adapter plate 210 in one of the tool rest insertion locations 214. The tool rest 220 location is dependent upon the size and shape of the wood stock used. Further, the tool rest 220 location is dependent upon the type of shaping or cutting being performed. Once the tool rest 220 is affixed to the chosen tool rest insertion location 214 by the tool rest stop nut 226, the drill is turned on. The motor 114 of the drill press 100 rotates the spindle 152, driving spur 154, and consequently the wood stock 300. While the wood stock 300 is being rotated by the drill press, a shaping tool is placed on the tool rest 220. The tool rest 220 provides stability and maneuverability to the tool for cutting or shaping of the wood stock 300 as it rotates.

Although described in terms of the preferred embodiments shown in the figures, those skilled in the art who have the benefit of this disclosure will recognize that changes can be made to the individual component parts thereof which do not change the manner in which those components function to achieve their intended result. As discussed above, changes such as the existence or nonexistence of a platform, the shape of the tool rest, the shape of the tailstock, and the methods of securing individual components are changes that are intended to fall within the scope of the following non-limiting claims.

I claim:

1. A drill press modified for use as a wood lathe for shaping wood stock with a shaping tool, the wood stock having first and second ends, the modified drill press comprising:
   a column having a base end and a free end, the base end for providing stability to the drill press;
   a power head mounted on the free end of the column;
   a power source located within the power head;
   a spindle affixed to the powerhead, the spindle forced into relatively high-velocity rotation by the power source;
   a chuck affixed to the spindle;
   a driving spur removably received by the chuck, the driving spur for engaging the first end of the wood stock;
   a platform attached to the column, the platform being adjustable along the longitudinal axis of the column to vary the distance between the platform and the chuck;
   an adapter plate affixed to the platform;
   a tool rest having an attachment end and a working end, the attachment end affixed to the adapter plate and the working end for resting and manipulating the shaping tool; and
   a tailstock having an adapter end and an engagement end, the adapter end removably attached to the adapter plate and the engagement end for engaging the second end of the wood stock.

2. The modified drill press of claim 1 wherein the base end of the column is affixed to a work table.

3. The modified drill press of claim 1 wherein the power head is adjustably mounted to the free end of the column, the power head being adjustable along an axis parallel to the column to vary the distance between the platform and the chuck.

4. The modified drill press of claim 1 wherein the spindle is adjustable in a direction parallel with the longitudinal axis of the column to accommodate different wood stock lengths.

5. The modified drill press of claim 1 wherein the tool rest is a bar.

6. The modified drill press of claim 1 wherein the tool rest is a plate with a hole through the center for inserting the shaping tool.

7. The modified drill press of claim 1 wherein the tool rest is a bar with a clasp for engaging the shaping tool.

8. The modified drill press of claim 1 wherein the engagement end of the tailstock is a conical point that engages the center of the second end of the wood stock.

9. The modified drill press of claim 1 wherein the height of the tailstock is adjustable.

10. An adapter kit for converting a drill press into a wood lathe for shaping wood stock, the wood stock having a first and second end, the drill press having a column, a power source mounted on the column, a spindle rotatably driven by the power source along an axis parallel to the column, a chuck affixed to the spindle, and a platform attached to the column, the platform being adjustable along the longitudinal axis of the column to vary the distance between the platform and the chuck, and the adapter assembly comprising:
    a driving spur removably received by the chuck for engaging the first end of the wood stock;
    an adapter plate affixed to the platform;
    a tool rest having an attachment end and a tool end, the attachment end affixed to the adapter plate and the tool end for resting and manipulating the shaping tool; and
    a tailstock having an adapter end and an engagement end, the adapter end removably attached to the adapter plate and the engagement end for engaging the second end of the wood stock.

11. The adapter kit of claim 10 wherein the tool rest is a bar.

12. The adapter kit of claim 10 wherein the tool rest is a plate having a hole through the center for inserting the shaping tool.

13. The adapter kit of claim 10 wherein the tool rest is a bar with a clasp for engaging the shaping tool.

14. The adapter kit of claim 10 wherein the engagement end of the tailstock is a conical point that engages the center of the second end of the wood stock.

15. The adapter kit of claim 10 wherein the height of the tailstock is adjustable.

16. A method of using an adapter kit for converting a drill press into a wood lathe for shaping wood stock, the wood stock having a first and second end, the drill press having a column, a power source mounted on the column, a spindle rotatably driven by the power source along an axis parallel to the column, a chuck affixed to the spindle, and a platform attached to the column, the platform being adjustable along the longitudinal axis of the column to vary the distance between the platform and the chuck, the adapter kit comprising a driving spur removably received by the chuck for engaging the first end of the wood stock, an adapter plate, a tailstock, and a tool rest, the method comprising the steps of:
    securing the adapter plate to the platform;
    affixing the tailstock to the adapter plate;
    affixing the driving spur to the chuck; and
    attaching the tool rest to the adapter plate.

* * * * *